United States Patent [19]
Hoffmeier

[11] Patent Number: 5,084,175
[45] Date of Patent: Jan. 28, 1992

[54] POOL FILTER

[75] Inventor: Dieter Hoffmeier, Ibbenbüren, Fed. Rep. of Germany

[73] Assignee: Oase-Pumpen Wübker Söhne Gmbh & Co., Maschinenfabrik, Hörstel-Riesenbeck, Fed. Rep. of Germany

[21] Appl. No.: 578,692

[22] Filed: Sep. 6, 1990

[30] Foreign Application Priority Data

Sep. 8, 1989 [DE] Fed. Rep. of Germany ....... 3930042

[51] Int. Cl.$^5$ .............................................. B01D 29/46
[52] U.S. Cl. .................................. 210/344; 210/416.2; 210/486; 210/488
[58] Field of Search ..................... 210/344, 345, 416.2, 210/483, 486, 487, 488, 232; 55/493, 509, 504

[56] References Cited

U.S. PATENT DOCUMENTS

| 618,964 | 2/1899 | Theurer | 210/344 |
|---|---|---|---|
| 888,731 | 5/1908 | Paul | 210/344 |
| 2,278,453 | 4/1942 | Kracklauer | 210/344 |
| 3,152,988 | 10/1964 | Gutkowski et al. | 210/488 |
| 3,443,697 | 5/1969 | Seggebruch | 210/344 |
| 4,385,911 | 5/1983 | Popeil et al. | 55/504 X |
| 4,419,234 | 12/1983 | Miller et al. | 210/232 |
| 4,851,112 | 7/1989 | Schlensker | 210/416.2 X |

Primary Examiner—Charles Hart
Attorney, Agent, or Firm—Jordan and Hamburg

[57] ABSTRACT

A pool filter with a housing having at least one opening for an inlet and at least one additional opening for an outlet, in which housing at least one filter pad in contact with its margins is arranged with both its sides freely accessible such that one side of the pad is connected to an inlet chamber and the other side of the pad to an outlet chamber, is configured for the purpose of easy adaptability to various filter capacity and fineness requirements and for easy handling and maintenance such that the housing includes a plurality of flatly stackable housing elements each with at least one filter pad which form terminal units and intermediate units of a pool filter set, the intermediate units being configured identical to one another and having next to the filter pad a bottom for separating the inlet chamber and outlet chamber of adjacent filter pads.

19 Claims, 2 Drawing Sheets

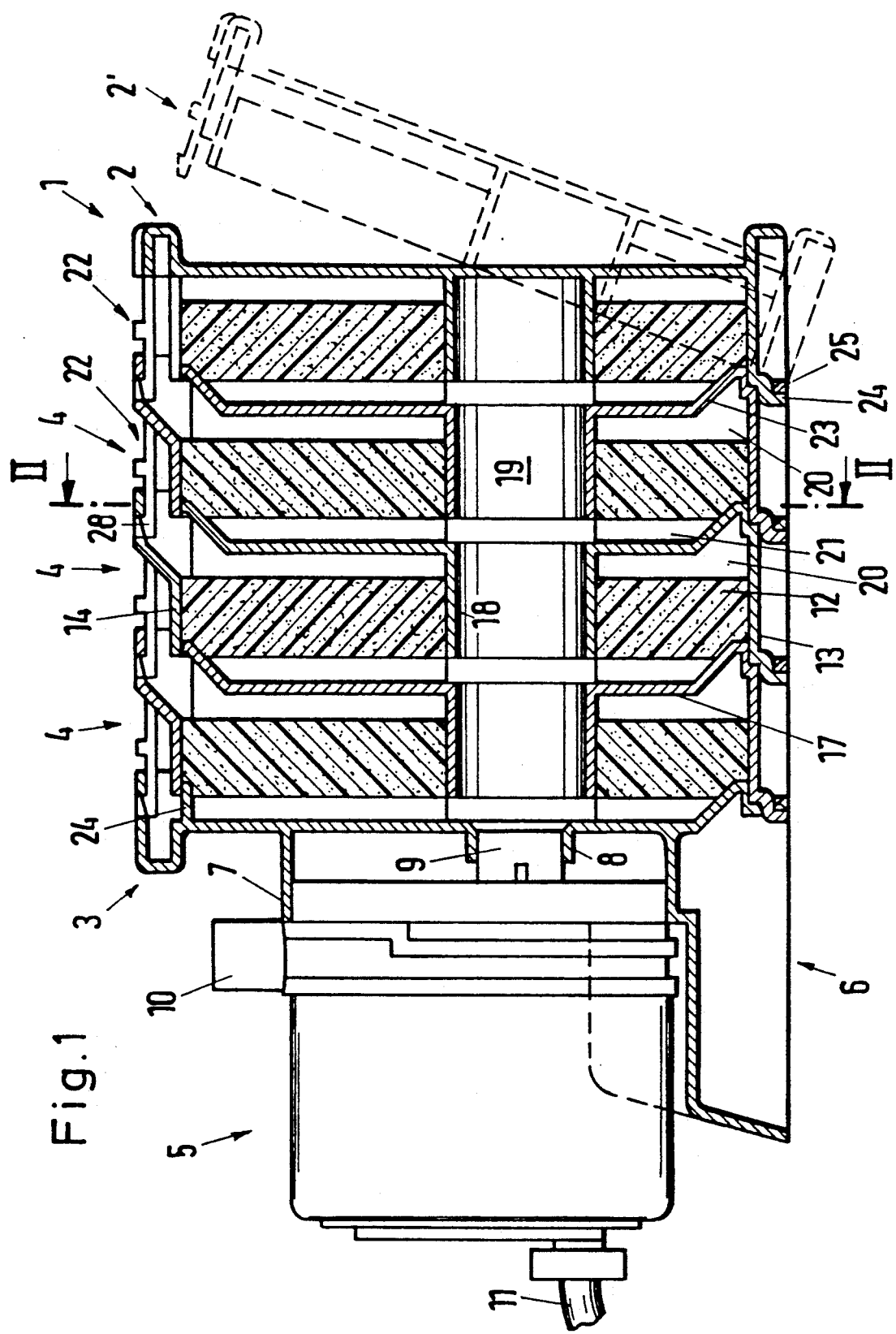

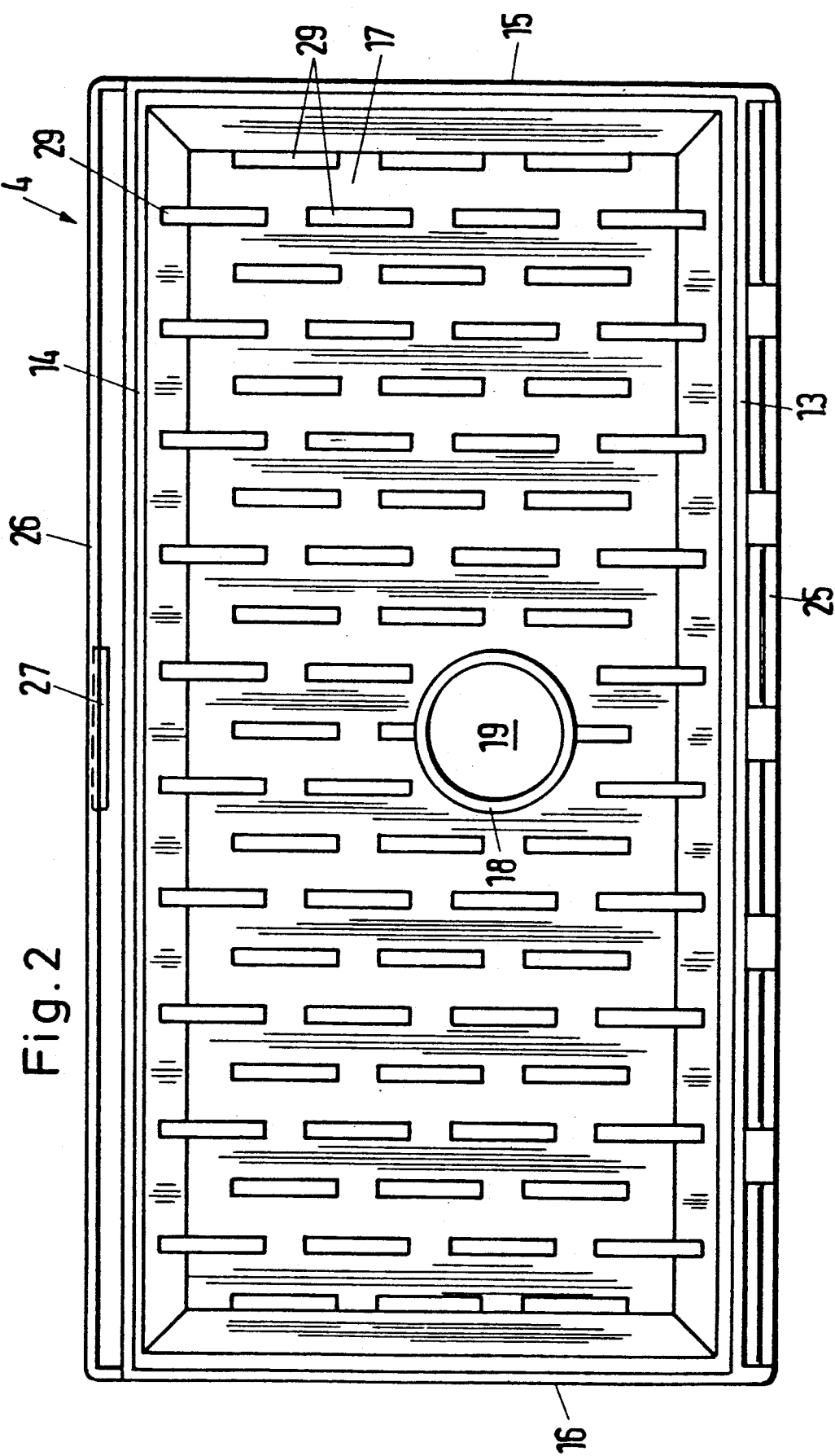

POOL FILTER

The invention relates to a pool filter.

Pool filters of this kind, along with a great number of forms of filters, are commonly used to prevent the contamination of the system of pipes, pumps and sometimes nozzles in fountains or recirculated streams of water. Inasmuch as it has become increasingly apparent that it may be desirable or called for to filter the water even in static pools to remove floating debris, but especially also sediment, different levels of filtering capacity and filter fineness have become necessary. Differences also are based on the volume of water in the pool if it is considered that the amount of water in a pool should pass twice to six times through the filter. All this leads to a confusing variety on the market and to insecurity and errors in the purchase of filters. Disadvantages of known filters are also found in the fact that only fine substances are trapped in the filter, while larger particles are stopped on the outside of it. When the filter is cleaned or replaced these particles remain in the pool, often also with a large percentage of fine dirt particles, so that the desired effect of the filter is obtainable only to a limited extent.

It is the object of the invention to create a pool filter which will well satisfy different filtering requirements and at the same time achieve an effective filtration of a wide range of undesirable substances and particle sizes, and which, in spite of these special requirements, will be so rugged and simple that it can be used in long-term applications even by lay people without any technical knowledge.

The basic principle of a filter which can be enlarged unit by unit, with filter pads having an inlet chamber on one side and an outlet chamber on the other provides a capacity that can be adapted to the rate of flow of the water, to the filtration requirements, and to the degree of contamination. Small or large numbers of filter housing units can be arrayed as needed, and as a result the filter units operate in parallel so that the load per filter pad decreases with the number of the housing units. This is important not only to the useful life of the filters, which increases progressively as the rate of flow through them decreases, but also to the filter quality, in that fine particles settle more easily and are less easily entrained.

As such a filter is expanded by the addition of intermediate elements, the number of the inlet chambers also becomes greater. Each of the inlet chambers offers advantages in the unit method of construction herein provided since it creates a capacity for the accumulation of particles, especially relatively large particles. These particles thus enter into the housing and are removed when the filter or filter pads are cleaned or replaced. Recontamination of the water, such as occurs in the case of filters with strainers preceding them or exposed filter surfaces, can thus be avoided. The capacity of the inlet chambers naturally increases with the number of filter units. Just the modifiability of the filter is a decided advantage in itself, since the actual need for filtration often cannot be estimated reliably when they are installed. Thus, it is not necessary to buy and install an oversize pool filter just to be on the safe side. It is not necessary, either, to settle for too small a pool filter, and instead the user can expand his pool filter as needed by adding intermediate filter units, or reduce it by removing intermediate units.

In addition, the unit construction makes it possible to vary the fineness of the filtration by replacing the filter pads or entire filter units. In any case, a filter system of relatively great surface area and low resistance to flow can be produced by a stacked array of filter units.

An embodiment of the invention is represented in the drawing and further explained below.

BRIEF DESCRIPTION OF THE DRAWINGS

FIG. 1 is a longitudinal section through a pool filter with attached motor-driven pump, and FIG. 2 is a view of the face of an intermediate unit for the pool filter of FIG. 1, as seen in the direction of the line II—II in FIG. 1.

DESCRIPTION OF THE PREFERRED EMBODIMENTS

The pool filter identified as a whole in FIG. 1 by 1, is composed of an end unit 2, which, when tilted away at an angle, is identified again as 2', a unit 3 at the opposite end, and three identical intermediate units 4. The construction of the end units 2 and 3 is in each case a modification of the intermediate units 4, end unit 2 being the terminal unit of the filter, while end unit 3 provides a mount 6 for a directly coupled motor-driven pump 5, a circumferential connection 7, and especially a suction connection 8 in which a suction connection 9 of the pump 5 is engaged, while a discharge connection 10 of the pump is perpendicular thereto (orientation is variable). A cable connection 11 is provided for supplying power to the pump motor 5. Each intermediate filter unit 4 includes a filter pad 12 of rectangular outline, which is in close contact at its edges which the surrounding walls 13, 14, 15, 16 (cf. also FIG. 2). The walls are part of an integral plastic pan having (parallel to the filter pad 12) a bottom 17 which has an opening 19 into an outlet connection 18 in a central area, the outlet connection 18 being in sealing contact circumferentially with the filter material of the filter pad 12.

The filter pads 12 are held at a distance from one another, and the intermediate spaces formed by the intervals between the filter pads are each divided by the bottoms 17 into an inlet chamber 20 and an outlet chamber 21, each of the inlet chambers 20 being in communication with the surrounding water through slots 22 along the top of the intermediate unit 4 (and end unit 2) while the outlet chambers are in communication with one another and with the suction connection 9 of the pump 5. The connections 18 run from the corresponding bottom 17 only through the width of the adjacent inlet chamber 20 and the adjacent filter pad 12, resulting in a free annular gap in the width of the outlet chamber 21 for the support of the adjacent intermediate unit 4 in each case.

Of special interest to a simple and problem-free stacking of the pan units is the fact that the bottom 17 is carried over by a marginal area 23 defining the outlet chamber 21 all the way to a tightly pressed contact with the adjacent filter pad. The sealing of the pan units against one another thus necessitates no additional sealing lips, sealing rings or the like. A completely identical function is served by a marginal portion 24 on the upper edge of the terminal unit 3 which embeds itself into the marginal area of the filter pad of the adjacent intermediate unit 4.

The filter units are assembled with one another in a simple and sturdy manner. The marginal areas of the pans are complementary to one another, so that they mate with one another and they cannot shift up, down or sideways on one another. FIG. 2 shows a face view of the bottom 17 and the surrounding walls 13, 14, 15 and 16. The walls 13, 15 and 16 overlap the walls of the adjacent unit. At the bottom, beneath the wall 13, a hinge-like hook system is formed having hooked projections 24 and hook eyes 25 on the one and on the other side. Resilient catches are formed on the upper side of the filter, while a bail 26 extending across the entire width of a unit bears a central hook 27 which engages a catch on the adjacent filter unit. This system is easy to assemble, facilitates handling and assures long and trouble-free service.

In FIG. 2 can be seen a grid of ribs 29 on the bottom 17. These maintain the distance between the bottom 17 and the adjacent filter pad 12 on the outlet side on which the filter pad 12 could become pressed flat against the bottom. These ribs 29 are advantageously created in short sections interrupted by spaces, so that they interfere only slightly if at all with the flow in the outlet chamber.

The foregoing explains the construction and operation of an intermediate unit composed of an integral plastic pan body and a tightly fitted filter pad. From this it is easy to understand the operation of the two terminal units 2 and 3 in which the terminal unit 2 serves to seal off the end of the combined outlet chambers 20. In other words, the terminal unit 2 could be replaced with an intermediate unit 4, in which case only the opening 19 of connection 18 would have to be stopped with a plug, a pad or the like. The peculiar configuration of the terminal unit of the present kind, however, permits satisfaction of requirements relating to the external appearance of the housing and enables the margin to be made desirably smooth, so that nothing will protrude to scratch or to catch on clothing.

The terminal unit 3 could fundamentally be formed by an intermediate unit 4 (less filter pad) by providing an adapter for connection to a submersible pump or a hose running to a pump. In the present case, here again a particular terminal unit has been created which will satisfy handling requirements by providing uniform edges and a place to mount the motor-driven pump.

The filter that has been represented is designed for a horizontal system. For this reason the terminal units 2 and 3 and the intermediate units 4 have a rectangular plan and slots 22 on the upper side only. In the case of an upright system, it would be desirable for the units to be circular in shape and stacked one on the other and to have slots on all sides.

Such a filter could also be used in aquaria.

What is claimed is:

1. A filter assembly formed by a plurality of filter units which are stackable on one another to form a stacked filter assembly without requiring a separate housing for the stacked filter assembly, comprising a plurality of filter units, each of said filter unit comprising a pan unit and a filter pad in said pan unit, each of said pan units having a bottom wall means, said filter pad being spaced from said bottom wall means to define an inlet space between said bottom wall means and said filter pad, each of said pan units having inlet means formed as inlet openings disposed as an outer edge portion of each pan unit, each of said pan units having integral connecting means for connecting juxtaposed pan units to one another such that an outlet chamber is formed between the bottom wall means of one pan unit and the filter pad of a juxtaposed pan unit with the fluid passing from said inlet space through said filter pad to said outlet chamber, each of said pan units having an integral central outlet means communicating with its respective outlet chamber and with the outlet means of juxtaposed pan units to define a common outlet for the fluid from said plurality of filter units, each of said outlet chambers having an outer marginal area formed by the respective pan unit and which abuts against the filter pad of a juxtaposed filter unit when said plurality of filter units are connected together by said connecting means, whereby a plurality of identical filter units are thereby connectable to one another to form a stacked filter assembly without requiring a separate housing for the stacked filter assembly.

2. A filter assembly according to claim 1, wherein each of said pan units are integrally formed in that said bottom wall means, said connecting means, said inlet means, said outlet means and said marginal area are all formed as a single integral pan unit.

3. A filter assembly according to claim 1, wherein said connecting means comprises cooperable pivot means on each of said pan units and cooperable catch means on each of said pan units such that one pan unit is connectable to another pan unit by attaching the pivot means of one pan unit to the pivot means of another pan unit and then pivoting said one pan unit about said pivot means to a connected position in which the catch means on said one pan unit engages the catch means on said other pan unit to thereby connect said two pan units together.

4. A filter assembly according to claim 3, wherein said catch means comprises a resilient catch part integrally formed with said pan unit.

5. A filter assembly according to claim 3, wherein said pivot means on each of said pan units is integrally formed with the respective pan unit, the pivot means of one pan unit being detachable from the pivot means of the juxtaposed pan unit upon disengagement of said catch means and upon pivoting said one pan unit away from said other pan unit.

6. A filter assembly according to claim 1, wherein one of said pan units is an end pan unit, and further comprising closure means for closing the outlet means of said end pan unit.

7. A filter assembly according to claim 1, wherein one of said pan units is an end pan unit, and further comprising suction means connected to said one end pan unit.

8. A filter assembly according to claim 3 further comprising an end unit for said filter assembly, said end unit comprising one of said pan units and a closure means closing the outlet means of said one pan unit.

9. A filter assembly according to claim 3 further comprising an end unit for said filter assembly, said end unit comprising one of said pan units, a suction means for said filter assembly, and adapter means connecting said one end unit to said suction means.

10. A filter assembly according to claim 1, wherein each of said outlet means comprises a conduit means integrally formed with each respective pan unit and extending through its respective filter pad.

11. A filter assembly according to claim 10, wherein said conduit means of each of said pan units are axially aligned.

12. A filter assembly according to claim 10, wherein each of said filter pads of said filter units has a through passage, said conduit means extending through said through passage, said through passage having an inner circumference tightly contracting the outer circumference of said conduit means.

13. A filter assembly according to claim 10, wherein said conduit means has an outside wall which defines a part of said inlet space.

14. A filter assembly according to claim 10, wherein said conduit means has an axial length substantially equal to the axial width of said filter pad plus the axial width of said inlet space.

15. A filter assembly according to claim 1, wherein each of said bottom wall means has an inner side which defines part of said inlet space, and spaced projections extending from said inner side into said inlet space and being engageable with the filter pad of said filter unit to thereby maintain the spacing between said bottom wall means and the filter pad.

16. A filter assembly according to claim 1, wherein each of said pan units has an outer marginal structure, said connecting means being disposed at said outer marginal structure to connect juxtaposed pan means to one another to form said filter assembly.

17. A filter assembly according to claim 1, wherein said connecting means comprises resilient catches integrally formed on each pan unit for securing one pan unit on a juxtaposed pan unit.

18. A filter assembly according to claim 1, wherein said connecting means comprises pivot means for pivotably disposing one pan unit on a juxtaposed pan unit.

19. A filter assembly formed by a plurality of filter units which are stackable on one another to form a stacked filter assembly without requiring a separate housing for the stacked filter assembly, comprising a plurality of filter units, each of said filter units comprising a pan unit and a filter pad in said pan unit, each of said pan units having a bottom wall, said filter pad being spaced from said bottom wall to define an inlet space between said bottom wall and said filter pad, each of said pan units having inlet means formed as inlet openings disposed at an outer edge portion of each pan unit, each of said pan units having connecting means for connecting juxtaposed pan units to one another such that an outlet chamber is formed between the bottom wall of one pan unit and the filter pad of a juxtaposed pan unit with the fluid passing from said inlet space through said filter pad to said outlet chamber, each of said pan units having a central outlet means communicating with its respective outlet chamber and with the outlet means of juxtaposed pan units to define a common outlet for the fluid from said plurality of filter units, each of said pan units having an abutting means which abuts against the filter pad of a juxtaposed filter unit when said plurality of filter units are connected together by said connecting means, whereby a plurality of identical filter units are thereby connectable to one another to form a stacked filter assembly without requiring a separate housing for the stacked filter assembly.

* * * * *